US009719861B2

(12) United States Patent
Ramaraju et al.

(10) Patent No.: US 9,719,861 B2
(45) Date of Patent: Aug. 1, 2017

(54) TEMPERATURE SENSOR CIRCUIT (71) Applicant: Freescale Semiconductor, Inc., Austin, TX (US)

(72) Inventors: Ravindraraj Ramaraju, Round Rock, TX (US); David R. Bearden, Austin, TX (US)

(73) Assignee: NXP USA, INC., Austin, TX (US)

( * ) Notice: Subject to any disclaimer, the term of this patent is extended or adjusted under 35 U.S.C. 154(b) by 457 days.

(21) Appl. No.: 14/459,056

(22) Filed: Aug. 13, 2014

(65) Prior Publication Data
US 2016/0047696 A1 Feb. 18, 2016

(51) Int. Cl.
G01K 7/01 (2006.01)

(52) U.S. Cl.
CPC ........... *G01K 7/01* (2013.01); *G01K 2219/00* (2013.01)

(58) Field of Classification Search
CPC ................................ G01K 2219/00
See application file for complete search history.

(56) References Cited

U.S. PATENT DOCUMENTS

| 5,317,287 | A | 5/1994 | Brown |
| 5,546,041 | A | 8/1996 | Szajda |
| 5,899,570 | A | 5/1999 | Darmawaskita et al. |
| 5,977,813 | A | 11/1999 | Boerstler |
| 6,011,422 | A | 1/2000 | Koglin et al. |
| 6,078,208 | A | 6/2000 | Nolan et al. |
| 6,097,239 | A | 8/2000 | Miranda et al. |
| 6,160,305 | A | 12/2000 | Sanchez |
| 6,554,469 | B1* | 4/2003 | Thomson ............... G01K 7/01 327/512 |
| 6,612,502 | B2 | 9/2003 | Poucher |
| 6,679,628 | B2* | 1/2004 | Breinlinger ........... G01K 7/01 257/467 |
| 6,869,216 | B1 | 3/2005 | Holloway et al. |
| 7,078,955 | B2 | 7/2006 | Kim et al. |
| 7,140,767 | B2 | 11/2006 | McLeod et al. |
| 7,202,696 | B1 | 4/2007 | Taheri |
| 7,331,708 | B2 | 2/2008 | Blom et al. |
| 7,429,129 | B2 | 9/2008 | St. Pierre et al. |
| 7,524,109 | B2 | 4/2009 | Gardner et al. |
| 7,532,056 | B2 | 5/2009 | Seo |
| 7,579,898 | B2 | 8/2009 | Soldera et al. |

(Continued)

FOREIGN PATENT DOCUMENTS

JP 2003264462 A * 9/2003

OTHER PUBLICATIONS

Notice of Allowance dated Oct. 17, 2016 in related U.S. Appl. No. 14/258,629.

(Continued)

*Primary Examiner* — Minh Phan
*Assistant Examiner* — Leon W Rhodes, Jr.

(57) ABSTRACT

A temperature sensor circuit implemented in electronic circuitry that senses the temperature at a site, digitizes the sensed temperature, and then outputs a signal representing such a sensed temperature. The temperature sensor circuit converts a voltage signal that is proportional to the temperature to a first digital value. The temperature sensor circuit converts a voltage signal that is inversely proportional to the temperature to a second digital value. The sensed temperature is determined as a function of a difference between the first and second digital values.

17 Claims, 6 Drawing Sheets (56) References Cited

U.S. PATENT DOCUMENTS

| | | | |
|---|---|---|---|
| 7,581,881 B2 | 9/2009 | Kim et al. | |
| 7,636,009 B2 | 12/2009 | Jo et al. | |
| 7,808,068 B2 | 10/2010 | Hartley | |
| 7,887,235 B2 | 2/2011 | Campos et al. | |
| 7,920,015 B2 | 4/2011 | Chellappa | |
| 7,953,569 B2 | 5/2011 | Jeong | |
| 8,093,083 B1* | 1/2012 | Hikosaka | H01L 21/0237 257/103 |
| 8,262,286 B2 | 9/2012 | Peterson et al. | |
| 8,308,358 B2 | 11/2012 | Doorenbos | |
| 8,330,445 B2* | 12/2012 | Herbst | G05F 3/30 323/312 |
| 8,432,214 B2 | 4/2013 | Olmos et al. | |
| 8,475,039 B2 | 7/2013 | Chern et al. | |
| 8,596,864 B2* | 12/2013 | Peterson | G01K 7/01 374/170 |
| 2001/0052864 A1* | 12/2001 | Shimizu | H03M 1/0673 341/141 |
| 2006/0111865 A1* | 5/2006 | Choi | G01K 7/01 702/130 |
| 2011/0255568 A1 | 10/2011 | Swei | |
| 2012/0104229 A1 | 5/2012 | Kwon et al. | |
| 2013/0121377 A1 | 5/2013 | Furuichi | |
| 2014/0086279 A1 | 3/2014 | Cao et al. | |

OTHER PUBLICATIONS

Non-final rejection dated Jun. 30, 2016 in U.S. Appl. No. 14/258,629.
U.S. Appl. No. 13/682,814, filed Sep. 27, 2012.
U.S. Appl. No. 14/258,629, filed Apr. 22, 2014.
U.S. Appl. No. 13/628,814, Sanchez, H., "Thermal Sensor System and Method Based on Current Ratio", Office Action—Notice of Allowance, mailed Jun. 30, 2015.
Aita et al., "Low-Power CMOS Smart Temperature Sensor With a Batch-Calibrated Inaccuracy of ±0.25° C. (±3σ) from −70° C.," IEEE Sensors Journal, vol. 13, No. 5, May 2013, pp. 1840-1848.
Andreou et al., "A Novel Wide-Temperature-Range, 3.9ppm/C CMOS Bandgap Reference Circuit," IEEE Journal of Solid-State Circuits, vol. 47, No. 2, pp. 574-581, Feb. 2012.
Duarte et al., "Temperature Sensor Design in a High Volume Manufacturing 65nm CMOS Digital Process," IEEE 2007 Custom Intergrated Circuits Conference (CICC), pp. 221-224.
Jeong et al., "Process Compensated CMOS Temperature Sensor for Microprocessor Application," 2012 IEEE, pp. 3118-3121.
Kim et al., "A Smart Temperature Sensor with an Internal CMOS Bandgap Reference Circuit and Clock Oscillators," Center for Distributed Sensor Networks, Gwangju Institute of Science and Technology (GIST), 261 Cheomdan-gwagiro, Buk-gu, Gwangju 500-712, Korea, 2008.
Kim, Chan-Kyung et al., "CMOS Temperature-Sensor with Ring Oscillator for Mobile DRAM Self-refresh Control." 2008 IEEE. 978-1-4244-1684-4/08, pp. 3094-3097.
Sebastiano, F. et al., A 1.2V 10 μW NPN-Based Temperature Sensor in 65nm CMOS with an Inaccuracy of ±0.2° C. (3o) from −70° C. to 125° C. © 2010 IEEE International Solid-State Circuits Conference, pp. 1-28.

\* cited by examiner

TEMPERATURE SENSOR CIRCUIT

CROSS-REFERENCE TO RELATED APPLICATION

This application is related to U.S. Patent Application Ser. No. 14/258,629, which is hereby incorporated by reference herein.

TECHNICAL FIELD

The present invention is related in general to a temperature sensor circuit, and in particular, to a temperature sensor circuit implemented within electronic circuitry.

BACKGROUND INFORMATION

It has become increasingly important to monitor temperatures within electronic circuitry (e.g., on an integrated circuit ("IC") die, or chip). For example, it is important to manage the on-die temperature in a multi-core SOC ("system on chip") due to issues pertaining to the positive feedback mechanism associated with leakage current and temperature, in that leakage current results in increases in temperature within the die circuitry. A temperature sensor can be used to monitor the temperature of an electronic component, such as a CPU ("central processing unit"), GPU ("graphics processing unit"), MPU ("microprocessor unit"), SOC ("system on chip"), etc. When the temperature exceeds a predetermined threshold, the temperature sensor can alert circuitry to slow down (or even shut down) the electronic component to reduce power consumption, and thus reduce the temperature so that overheating that can cause destructive failure to the electronic component may be prevented.

Typically, temperature sensors include a reference circuit and temperature measuring circuitry, wherein the temperature dependency is either proportional to absolute temperature ("PTAT"), wherein the measuring circuit outputs a voltage that increases in proportion to a rise in temperature at the location of the electronic circuitry in which the temperature sensor is located (i.e., has a positive temperature coefficient), or complementary to absolute temperature ("CTAT"), wherein the measuring circuit outputs a voltage that decreases in proportion to a rise in temperature at the location of the electronic circuitry in which the temperature sensor is located (i.e., has a negative temperature coefficient). Further, DAC ("digital-to-analog converter") based temperature sensors have been implemented relying on comparing a PTAT voltage and a CTAT base-emitter voltage. This approach, however, has suffered from DAC code-to-temperature non-linearity issues; that is, such temperature sensors cannot achieve good linearity over a wide temperature range, resulting in poor temperature measurement accuracy.

DETAILED DESCRIPTION

Aspects of the present invention essentially provide a temperature sensing circuit or process implemented on electronic circuitry that senses the temperature at a location (site) within the electronic circuitry, and then outputs a signal representing such a sensed temperature based on a difference between PTAT and CTAT voltages produced as a function of the sensed temperature.

Figure 1:
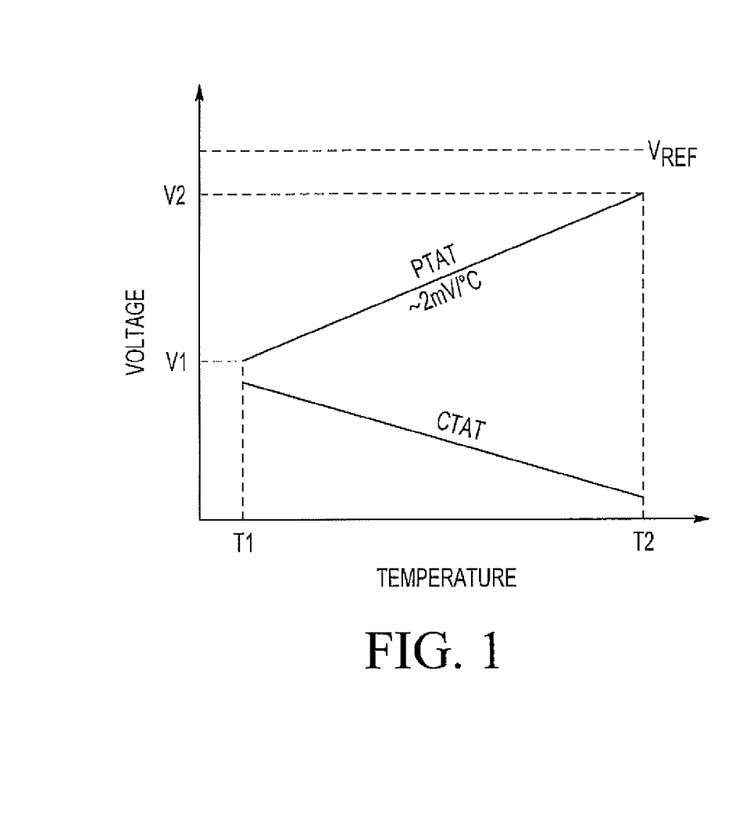
FIG. 1 illustrates an exemplary plot showing relationships of PTAT and CTAT voltages to temperature.

FIG. 1 illustrates an exemplary plot showing the relationships of PTAT and CTAT voltages to temperatures (e.g., operating temperatures of electronic circuitry (e.g., in an integrated circuit) in which a temperature sensor circuit configured in accordance with embodiments of the present invention would be implemented). As will be further disclosed herein, circuitry within the temperature sensor circuit outputs a voltage (for a fixed current) that increases in proportion to a temperature rise or has a positive temperature coefficient, within a portion of the overall electronic circuitry in which a temperature sensor circuit is implemented. Such a temperature dependency is referred to as being proportional to absolute temperature ("PTAT"). The temperature sensor circuit will also produce a voltage that drops in proportion to a temperature rise, or has a negative temperature coefficient, within the electronic circuitry being measured, and is referred to as the complementary to absolute temperature ("CTAT") voltage. The exemplary plot of FIG. 1 illustrates how the PTAT voltage (noted herein as "$V_{PTAT}$") increases from a first voltage V1 to a second voltage V2 as the temperature increases from a first temperature T1 to a second temperature T2, and how the CTAT voltage (noted herein as "$V_{CTAT}$") decreases as the temperature increases from the first temperature T1 to the second temperature T2.

Figure 2:
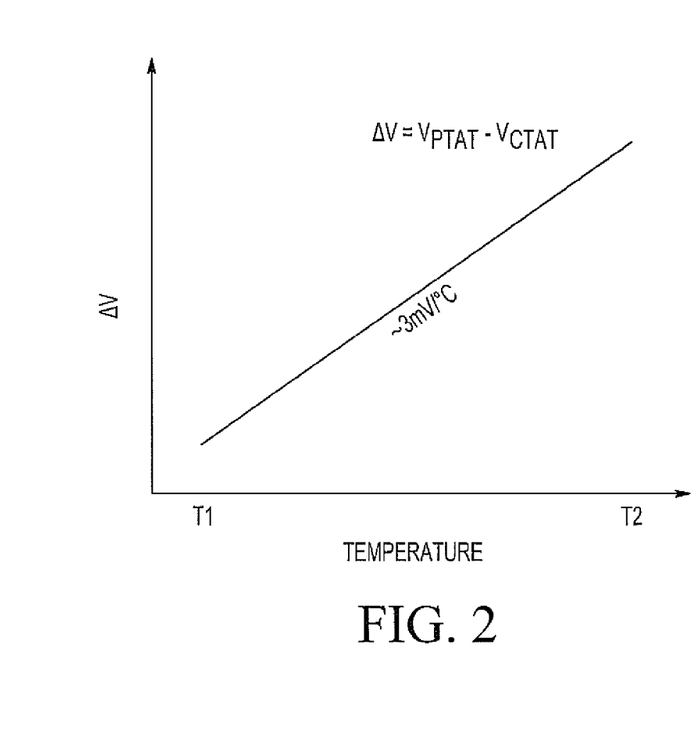
FIG. 2 illustrates an exemplary plot showing a temperature conversion using PTAT and CTAT voltages.

It can be seen from FIGS. 1 and 2 that the difference, $\Delta V$, between the $V_{PTAT}$ voltage and the $V_{CTAT}$ voltage (i.e., $V_{PTAT} - V_{CTAT}$), linearly increases with increasing temperature (the term $\Delta V$ also is referred to herein as the difference voltage or the difference voltage value). Thus, the difference between $V_{PTAT}$ and $V_{CTAT}$ can be used to represent the temperature of a location on a semiconductor integrated circuit because it has a linear function directly proportional to temperature. Moreover, the $\Delta V$ has a higher mV/° C. (approximately 3 mV/° C.) compared to that of $V_{PTAT}$ (approximately 2 mV/° C.). Therefore, the temperature can be measured with greater accuracy due to the larger difference in voltage per degree.

Figure 5:
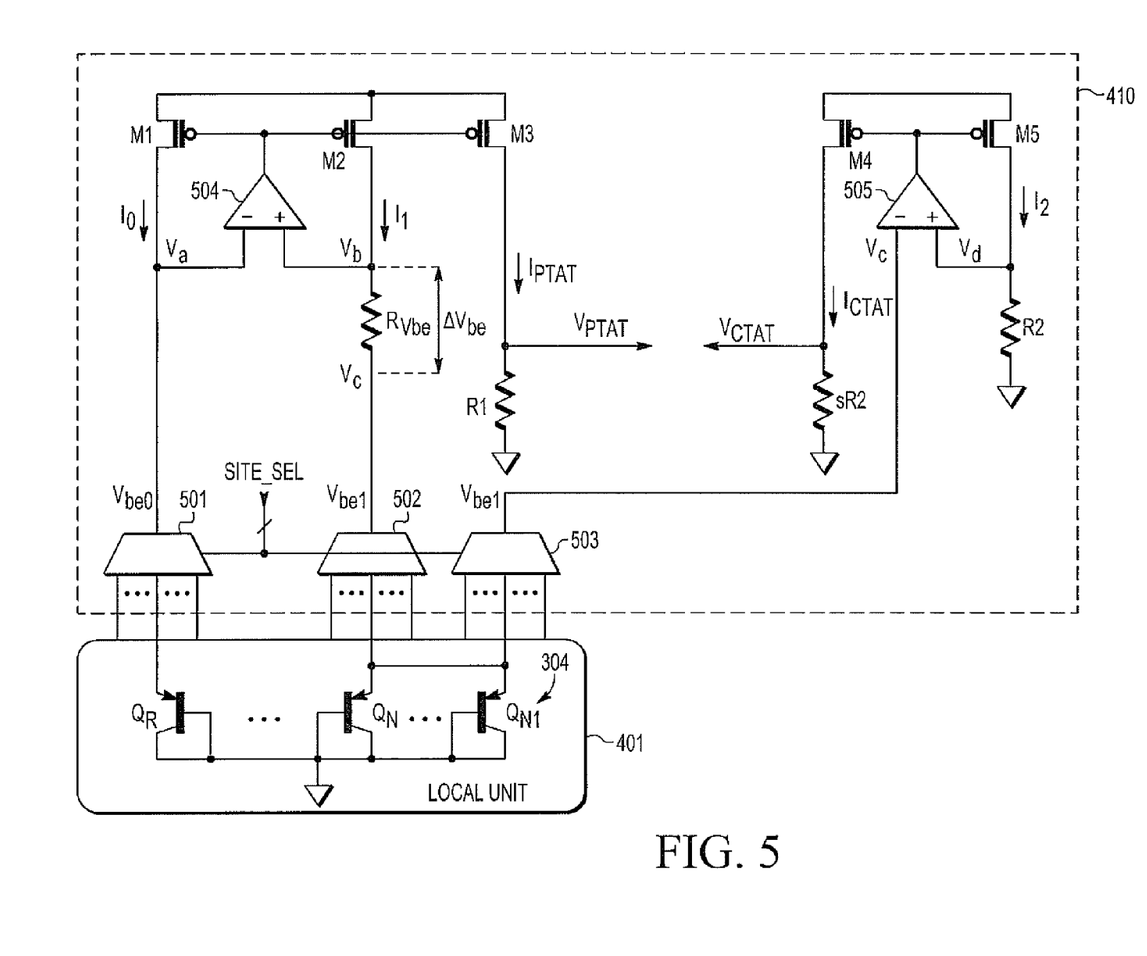
FIG. 5 illustrates electronic circuitry for conversion of a sensed temperature to voltage value(s).

As further described with respect to FIG. 5, embodiments of the present invention essentially provide PTAT and CTAT generation circuitry, wherein the PTAT voltage generation circuitry is used to also generate the CTAT voltage, so that the PTAT and CTAT voltages track each other. As depicted in FIG. 2, embodiments of the present invention then utilize differences between the PTAT and CTAT voltages as a direct measure of the temperature that is being sensed within a portion of the electronic circuitry in which the temperature sensor circuit has been implemented. In embodiments of the present invention, a single PTAT voltage is used for the reference across the entire temperature range.

Figure 3:
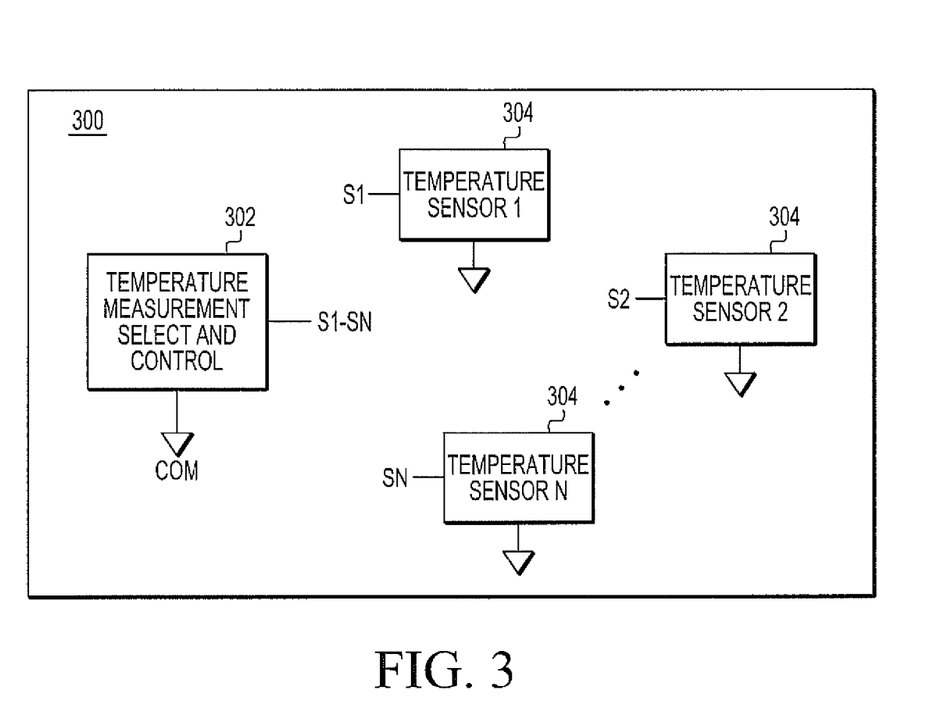
FIG. 3 illustrates exemplary electronic circuitry configured in accordance with embodiments of the present invention.

FIG. 3 illustrates a simplified block diagram of an exemplary electronic system (also referred to herein as "electronic circuitry") 300 in which a temperature sensor circuit configured in accordance with embodiments of the present invention has been implemented. The electronic system 300 may comprise any type of electronic component, such as a CPU, GPU, MPU, SOC, etc. As shown, N temperature sensors 304, individually numbered temperature sensor 1, temperature sensor 2, ... temperature sensor N (in which N is any positive integer greater than 0) are distributed in the system 300. Each temperature sensor 304 is implemented in proximity to the location of its corresponding "site" for determining the temperature at that location within the electronic system 300, and develops a corresponding temperature sense signal S1 ... SN provided to the temperature measurement select and control block 302. The temperature measurement select and control block 302 accesses and activates a selected one or more of the temperature sensors 304 for determining and outputting a temperature at the corresponding one or more locations (sites).

The electronic system 300 may be implemented on an integrated circuit ("IC") die or chip, or as part of an embedded processing system, or the like. In this case, the multiple temperature sensors 304 may be implemented to determine the temperatures at corresponding locations on the chip. Although multiple temperature sensors 304 are shown, N may also be 1 for a configuration with only one temperature sensor 304. Alternatively, the electronic system 300 may be implemented in a discrete manner in which the temperature measurement select and control block 302 and the one or more temperature sensors 304 are each implemented on a separate IC, or otherwise may include any combination of one or more ICs or semiconductor chips, or the like. The electronic system 300 may be configured for any type of application, such as communication systems, computer systems, sensing devices, etc., and for any one or more of consumer, industrial, commercial, computing, or automotive fields.

Figure 4:
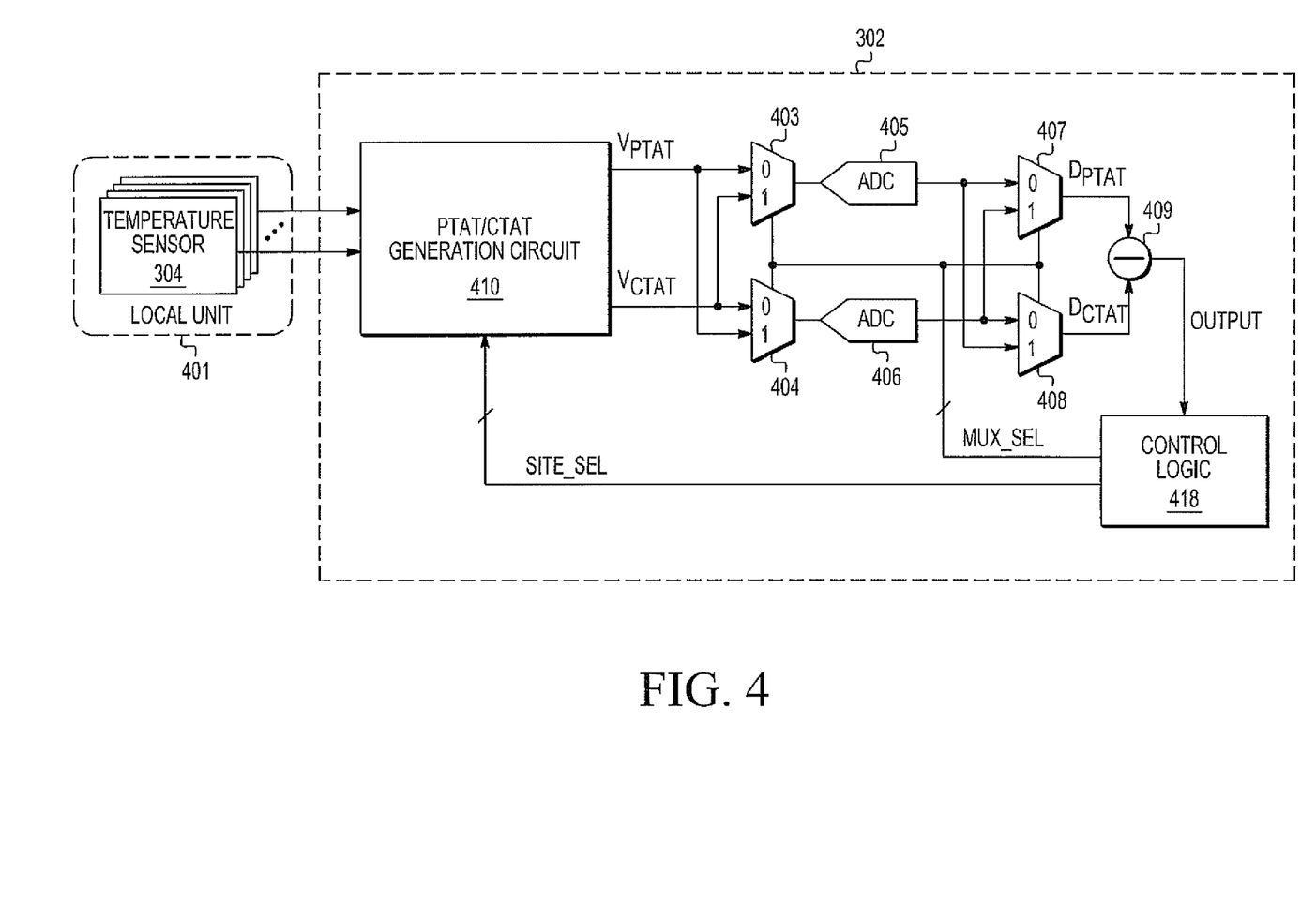
FIG. 4 illustrates a temperature sensor circuit configured in accordance with embodiments of the present invention.

FIG. 4 illustrates a block diagram of a temperature sensor circuit configured in accordance with embodiments of the present invention. For purposes of describing embodiments of the present invention, FIG. 4 shows the temperature sensors 304 as part of a designated local unit 401, the reason of which will be more apparent in the discussion of FIG. 5 hereinafter. The temperature measurement select and control block 302 includes a PTAT/CTAT generation circuit 410, which produces the $V_{PTAT}$ and $V_{CTAT}$ voltages as a function of a temperature sensed by one or more of the remote temperature sensors 304.

Figure 7:
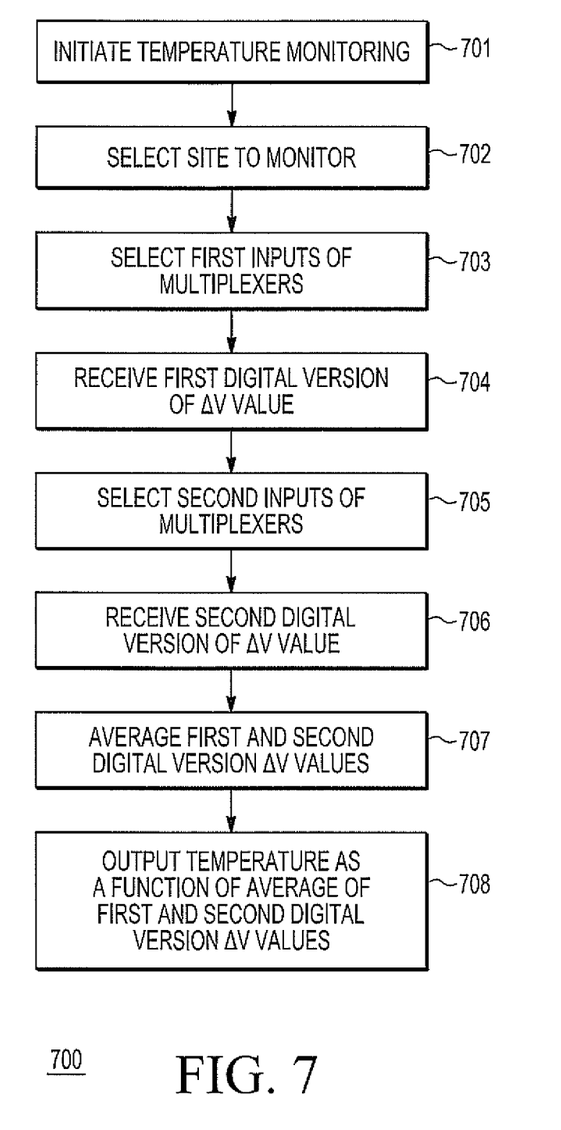
FIG. 7 illustrates a flow diagram of a process for determining a temperature of a location (site) within electronic circuitry in accordance with embodiments of the present invention.

As will be further described with respect to FIGS. 5 and 7, the PTAT/CTAT generation circuit 410 receives a temperature sensor site control signal, SITE_SEL, from the control logic 418. The $V_{PTAT}$ and $V_{CTAT}$ voltages (also referred to herein as voltage signals) are sent to the multiplexers 403 and 404. The control logic 418 will send an input selection signal, MUX_SEL, to the multiplexers 403 and 404 to first select the $V_{PTAT}$ voltage to be transmitted through the multiplexer 403 to the analog-to-digital converter ("ADC") 405 and the $V_{CTAT}$ voltage to be sent to the ADC 406. As is well-known, an analog-to-digital converter is a device that converts a continuous physical quantity (e.g., a voltage, or voltage signal) to a digital number (e.g., N binary bits) that represents the quantity's amplitude. Thus, the ADC 405 and the ADC 406 convert the received voltage signals to respective digital versions thereof, i.e., digital (e.g., binary) values of N bits (where N is a positive integer). Thus, the $V_{PTAT}$ voltage is converted to a digital version thereof, digital value $D_{PTAT}$, by the ADC 405, while the $V_{CTAT}$ voltage is converted to a digital version thereof, digital value $D_{CTAT}$, by the ADC 406. These digital values, $D_{PTAT}$ and $D_{CTAT}$, are then sent by the ADC 405 and the ADC 406, respectively, to the multiplexers 407 and 408. Since the control logic 418 has selected the first (e.g., "0") input for the multiplexers 403, 404, 407, and 408, these digital values, $D_{PTAT}$ and $D_{CTAT}$, will be output to the subtraction circuitry 409, which produces a difference voltage value, $D_{PTAT}$-$D_{CTAT}$, between the two digital values $D_{PTAT}$ and $D_{CTAT}$ for output to the control logic 418. This digital version of the difference voltage value $\Delta V$ is then used to determine the operating temperature of the sensed location within the electronic circuit.

As will be further described hereinafter, embodiments of the present invention produce another, or second, iteration of the digital bit values for purposes of alleviating or mitigating potential conversion errors inherent in the analog-to-digital converters. However, embodiments of the present invention are not limited to requiring production of two or more such iterations of the digital bit values, and as such do not require implementation of the multiplexers. Furthermore, the multiplexers 407 and 408 are implemented in embodiments of the present invention in order that the digital values $D_{PTAT}$ and $D_{CTAT}$ are sent into the same inputs into the subtraction circuitry 409 for each of the iterations. However, the subtraction circuitry 409 may be configured in embodiments of the present invention so that it can receive the digital values $D_{PTAT}$ and $D_{CTAT}$ into any of its inputs and still properly function for producing the difference voltage value $D_{PTAT}$-$D_{CTAT}$.

It is well known that analog-to-digital converters are subject to offset and gain errors resulting from variations in the reference voltage, $V_{REF}$, utilized to power the ADC. The temperature independent reference voltages utilized in previous temperature sensor circuits were generated by using bandgap circuitry. These circuits require characterization and trimming (i.e., adjustments) to account for the variations during fabrication, which involves additional costs. Therefore, having a reference voltage that is not accurate but can be used to measure the temperature is desirable.

Embodiments of the present invention alleviate or mitigate such problems associated with a floating reference voltage since the difference between the PTAT and CTAT voltages is utilized for determining the temperature of the selected temperature sensor site within the integrated circuit. In other words, as indicated in FIG. 1, for a particular value of the reference voltage, $V_{REF}$, the difference, $\Delta V$, in the PTAT and CTAT voltages remains constant regardless of the variations in the reference voltage. This can be seen in the fact that the difference voltage $\Delta V$ is equal to ($V_{PTAT}$-$V_{REF}$)-($V_{CTAT}$-$V_{REF}$), where $V_{REF}$ represents the common reference voltage utilized by (energizing) the ADC 405 and the ADC 406. Thus, changes in value (magnitude) of the reference voltage, $V_{REF}$, resulting from changes in temperature does not affect the value of the difference voltage $\Delta V$. If the reference voltage, $V_{REF}$, increases (e.g., from its mean operating value), the digital value of $V_{PTAT}$ (i.e., $D_{PTAT}$) will decrease, and similarly the digital value of $V_{CTAT}$ (i.e., $D_{CTAT}$) will decrease, resulting in the difference in the digital values, $D_{PTAT}$-$D_{CTAT}$, remaining the same. Similarly, if the reference voltage, $V_{REF}$, decreases (e.g., from its mean operating value), the digital value of $V_{PTAT}$ (i.e., $D_{PTAT}$) will increase, and similarly the digital value of $V_{CTAT}$ (i.e., $D_{CTAT}$) will increase, resulting in the difference in the digital values, $D_{PTAT}$-$D_{CTAT}$, remaining the same. As a result, a temperature independent reference voltage source(s) for energizing the analog-to-digital converters is not needed in embodiments of the present invention. Therefore, in embodiments of the present invention, any one or more of the ADC 405 and the ADC 406 are energized by a reference voltage source(s) that outputs a reference voltage that fluctuates in magnitude as a function of temperature.

Furthermore, offset and gain errors associated with analog-to-digital converters can be further alleviated or mitigated by the multiplexing of the $V_{PTAT}$ and $V_{CTAT}$ voltage signals, in accordance with embodiments of the present invention. In other words, as further described hereinafter with respect to FIG. 7, the control logic 418 will then select the second (e.g., "1") inputs to the multiplexers 403, 404, 407, and 408 to determine another, or second, iteration of the $D_{PTAT}$ and $D_{CTAT}$ digital values, whereby the ADC 405 now converts the $V_{CTAT}$ voltage signal into its digital version thereof, digital value $D_{CTAT}$, while the ADC 406 now converts the $V_{PTAT}$ voltage signal into its digital version thereat digital value $D_{PTAT}$. This second iteration of the difference value of the $D_{PTAT}$ and $D_{CTAT}$ digital values is also calculated by the subtraction circuitry 409 for output to the control logic 418, which then averages the two iterations of the difference values.

FIG. 5 illustrates further details regarding the circuitry utilized to implement the local unit 401 and the PTAT/CTAT generation circuit 410, in accordance with embodiments of the present invention. Depicted within the local unit 401 in FIG. 5 is a temperature sensor site 304. This temperature sensor site 304 may be selected from the N temperature sensors 304 shown in FIG. 3 by the SITE_SEL signal received by multiplexers 501, 502, and 503, which are coupled to each of the N temperature sensors 304.

In embodiments of the present invention, a differential bipolar junction transistor ("BJT") diode array may be utilized to sense the temperature at a selected temperature sensor site 304, instead of utilizing a single BJT diode array. As a result, as further described hereinafter, a $\Delta V_{be}$ voltage value is generated instead of merely relying upon a single voltage value of $V_{be}$.

Figure 6:
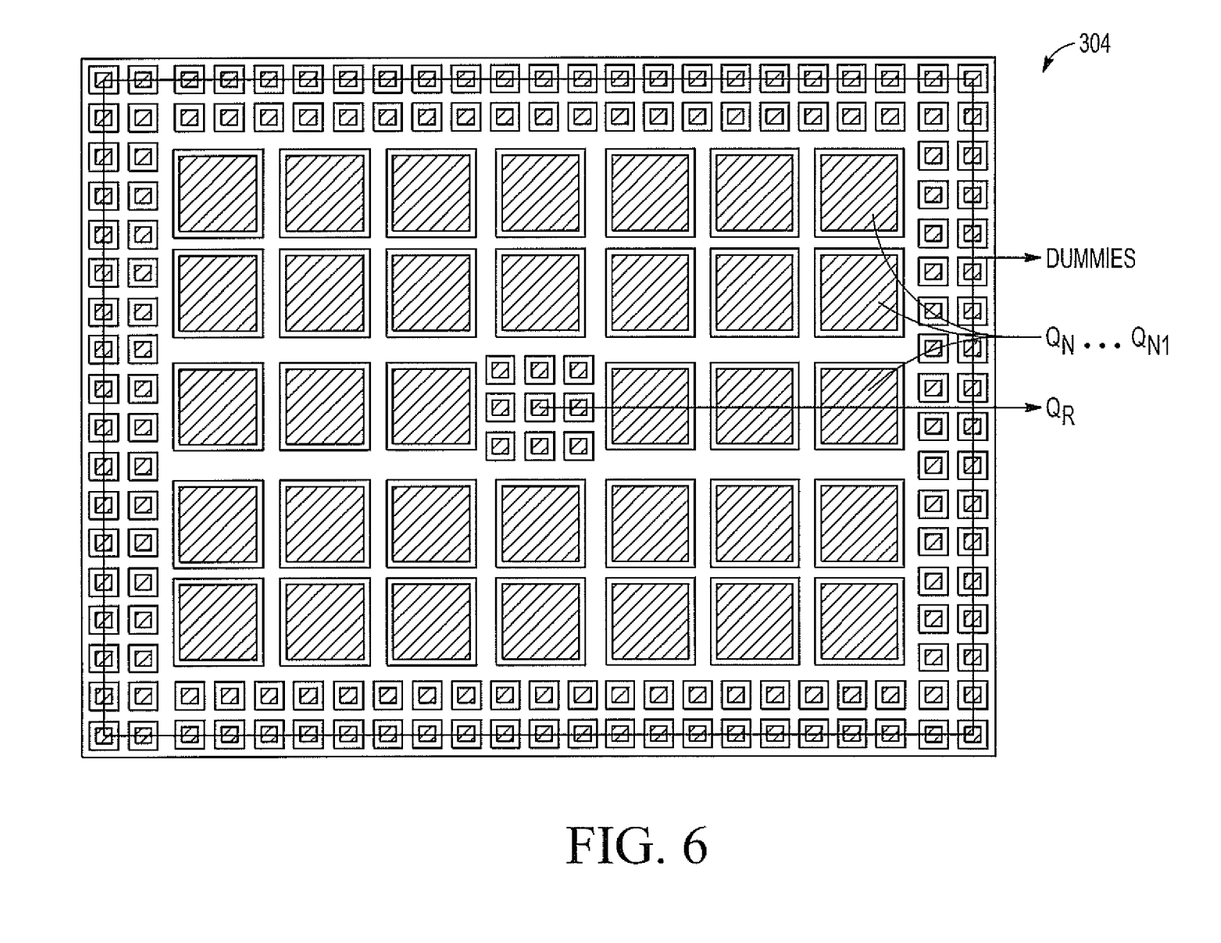
FIG. 6 illustrates an exemplary circuit layout of a remote temperature sensor.

FIG. 6 illustrates an exemplary circuit layout of a remote temperature sensor site 304 implemented on a die or chip, in accordance with embodiments of the present invention. Diode $Q_R$ has a significantly smaller diode area than the diodes $Q_N \ldots Q_{N1}$ surrounding diode $Q_R$. The base emitter voltage $V_{be}$ is a function of current density, which is a function of the device's emitter injection area. Embodiments of the present invention utilize the ratio of the injection areas of the emitters between the diodes $Q_R$ and $Q_N \ldots Q_{N1}$. Diode $Q_R$ may be comprised of one or more BJT diodes, and $Q_N \ldots Q_{N1}$ may be comprised of two or more BJT diodes, but regardless, the total injection area of the parallel connected diodes $Q_N \ldots Q_{N1}$ is greater than the injection area for the diode(s) $Q_R$. Note that the device layout illustrated in FIG. 6 is merely exemplary. In this illustrated example, there are nine diodes $Q_R$ shown surrounded by thirty-four diodes $Q_1 \ldots Q_{34}$. Any number of the diodes $Q_R$ may be activated for utilization in a temperature sensor site 304, with the inactive diodes acting as "dummies." The same may be true with respect to the diodes $Q_1 \ldots Q_{34}$, which are shown surrounded by one or more "rings" of dummy devices. Dummy devices may operate as a means for signal buffering/separation from adjoining devices on the die or chip.

A device layout as shown in the exemplary layout in FIG. 6 provides the previously noted ratio of emitter injection areas for a temperature sensor site 304. It is this ratio of emitter injection areas that enables the generation of the $\Delta V_{be}$ value, in accordance with embodiments of the present invention. As temperature increases at the temperature sensor site 304, the base to emitter voltages of the BJT diodes decreases. However, the base-emitter voltage for the voltage $V_{be1}$ from the parallel arrangement of the diodes $Q_N \ldots Q_{N1}$ is generally less than the base-emitter voltage $V_{be0}$ from diode $Q_R$ for a given temperature, because the emitter current density is lower. Moreover, this difference linearly increases with increasing temperature; thus, the $\Delta V_{be}$ value increases with temperature.

Alternatively, the temperature sensors 304 may be configured utilizing PN junction diodes, diode-coupled PNPs, NPN transistors, or the like.

Returning to FIG. 5, a first current mirror is created by the combination of the transistors (e.g., p-channel field effect transistors ("PFET")) M1, M2, and an operational amplifier 504 in order to have the currents $I_0$ and $I_1$ mirror each other. The current $I_0$ is created by the base-emitter voltage $V_{be0}$ from diode $Q_R$, while current $I_1$ is created by the base-emitter voltage $V_{be1}$ from the parallel arrangement of diodes $Q_N \ldots Q_{N1}$.

As shown in FIG. 5, once a temperature sensor 304 at a location is selected, voltages $V_{be0}$ and $V_{be1}$ (which adjust, or vary, as a function of the operating temperature at the location) are sensed by the PTAT/CTAT generation circuit 410. The operational amplifier 504 functions to maintain as equal its input voltages $V_a$ and $V_b$. Since $V_a = V_{be0}$, then $V_b = V_{be0}$. $\Delta V_{be}$ is the voltage drop across the resistor $R_{Vbe}$, which is equal to $V_b - V_c$. $V_c$ is equal to $V_{be1}$. Therefore, $\Delta V_{be}$ is equal to $V_{be0} - V_{be1}$. Since the currents $I_1$ and $I_{PTAT}$ are forced to be the same, the PTAT voltage signal, $V_{PTAT}$, produced through resistor R1 is proportional to $\Delta V_{be}$.

The outputs of multiplexers 502 and 503 are providing the same voltage $V_{be1}$, which is therefore input as voltage $V_c$ into the negative input of the operational amplifier 505; the positive input of the operational amplifier 505 receives the voltage $V_d$. The second current mirror configured from the operational amplifier 505 and the transistors (e.g., PFETs) M4 and M5 produces the current $I_2$ running through resistor R2, which produces the ICAT current, $I_{ICAT}$, which produces the CTAT voltage signal, $V_{CTAT}$, through resistor sR2. Thus, the CTAT voltage signal, $V_{CTAT}$, is proportional to voltage $V_{be1}$.

As a result of the foregoing, the PTAT voltage signal, $V_{PTAT}$, is proportional to increases in temperature at the location of the selected temperature sensor 304, while the CTAT voltage signal, $V_{CTAT}$, is inversely proportional to temperature increases at the location of the selected temperature sensor 304. Furthermore, the configuration of the PTAT/CTAT generation circuit 410 results in the $V_{PTAT}$ and $V_{CTAT}$ voltage signals tracking each other.

Embodiments of the present invention for performing the foregoing will now be described with respect to FIG. 7, with further reference to FIGS. 4 and 5. All or a portion of the process 700 may be implemented in the control logic 418. In step 701, the control logic 418 initiates temperature monitoring, for example, in response to an externally generated signal, such as from a user or another process running on the IC chip (e.g., electronic system 300) on which an embodiment of the present invention is implemented, or in response to an automatically or intermittently generated internal signal (e.g., generated by a process implemented within the control logic 418) to monitor the temperature at one or more of the temperature sensor sites 304.

In step 702, the control logic 418 determines which of the temperature sensor sites 304 it selects to monitor next, and sends the SITE_SEL signal to the multiplexers 501, 502, and 503 in order that the voltages of diodes $Q_R$ and $Q_N \ldots Q_{N1}$ at the selected temperature site 304 are sensed. A result is the generation of the $V_{PTAT}$ and $V_{CTAT}$ voltage signals by the PTAT/CTAT generation circuit 410, as previously described with respect to FIG. 5.

As previously noted, in step 703, the control logic 418 will send a MUX_SEL signal to the multiplexers 403, 404, 407, and 408 to select the first (e.g., "0") inputs to these multiplexers. This will result in the ADC 405 converting the $V_{PTAT}$ voltage signal it receives at its input from the output of the multiplexer 405 to the digital version of the $V_{PTAT}$ voltage signal, which is the $D_{PTAT}$ digital value, which will then be selected by the multiplexer 407 for output into the subtraction circuitry 409. This will also result in the $V_{CTAT}$ voltage signal being converted by the ADC 406 to the digital version of the $V_{CTAT}$ voltage signal, which is the $D_{CTAT}$ digital value, which is selected by the multiplexer 408 for input into the subtraction circuitry 409. The subtraction circuitry 409 will then produce a digital version of the difference voltage value, $\Delta V$, which is equal to the difference between the $D_{PTAT}$ and $D_{CTAT}$ digital values, i.e., $D_{PTAT}-D_{CTAT}$. The subtraction circuitry 409 may be comprised of any well-known circuitry for producing a difference value from inputted digital values. For example, subtraction circuitry 409 may be implemented with a digital adder circuit, whereby the subtraction is performed by adding the 1's complement of one input to the other input, resulting in a subtracted value between the two inputs (e.g., $D_{PTAT}$ and $D_{CTAT}$). Alternatively, a 2's complement method may be used for the subtraction circuitry 409. Both of the 1's and 2's complement methods for subtraction of digital, or binary, numbers are well-known in the art.

In step 704, this first digital version of the difference voltage value, $\Delta V$, is received by the control logic 418 (this first digital version of the difference voltage value, $\Delta V$, is also referred herein as the first iteration of the difference voltage value). In step 705, the control logic 418 will then use the MUX_SEL signal to select the second (e.g., "1") inputs for the multiplexers 403, 404, 407, and 408. This will result in the ADC 405 digitizing the $V_{CTAT}$ voltage signal to produce a second iteration of the digital version of the $V_{CTAT}$ voltage signal, $D_{CTAT}$, which is selected by the multiplexer 408 for input into the subtraction circuitry 409. Likewise, this will also cause the $V_{PTAT}$ voltage signal to be digitized by the ADC 406 to produce a second iteration of the digital version of the $V_{PTAT}$ voltage signal, $D_{PTAT}$, which will be selected by the multiplexer 407 for input into the subtraction circuitry 409. In step 706, this second iteration of the difference voltage value, $\Delta V$, from the subtraction circuitry 409 will then be received by the control logic 418.

In step 707, the control logic 418 will average the received first and second iterations of the difference voltage value, $\Delta V$. In step 708, the control logic 418 will output the temperature of the location of the selected temperature sensor 304 as a function of the average of the first and second iterations of the difference voltage value, $\Delta V$. This corresponding temperature may be determined in various manners. For example, when the IC chip (electronic system 300) is being manufactured, each of the temperature sensor sites 304 can be intentionally heated to one or more specifically known temperatures. These one or more specifically known temperatures can then be utilized in the process 700 to generate a lookup table. For example, a first $\Delta V$ can be determined at a first temperature for the temperature sensor site; then a second $\Delta V$ can be determined at a second temperature for that temperature sensor site; then, using a straight line equation calculation, the operating temperatures for all $\Delta V$ measurements can be computed (as shown in the exemplary plot in FIG. 2) and inserted in the lookup table. The resultant lookup table stored in the control logic 418 will thus include a unique $\Delta V$ for each corresponding temperature.

Another manner in which to determine the temperature to output in step 708 is to produce a corresponding straight line fitting equation that may be implemented in software or hardware in the control logic 418, which will then be utilized to output the temperature as a function of the measured $\Delta V$.

The digital versions of the previously disclosed voltage signals may also be processed by a digital filter technique to remove any noise due to the utilized non-standard voltage references. Such digital filtering may be implemented with a simple averaging technique, a moving area technique, a fancy Kalman filtering technique, or any other equivalent technique.

Aspects of the present invention disclose a system for determining a temperature of a location in electronic circuitry, in which the system includes first circuitry, in proximity to the location in the electronic circuitry, configured to adjust first and second output voltages as a function of an operating temperature of the electronic circuitry at the location; second circuitry configured to convert the first and second output voltages to a first voltage signal that is proportional to the operating temperature; third circuitry configured to convert the second output voltage to a second voltage signal that is inversely proportional to the operating temperature; fourth circuitry configured to determine a difference between the first voltage signal and the second voltage signal to produce a difference voltage value; and fifth circuitry configured to determine the temperature of the location in the electronic circuitry as a function of the difference voltage value. The second circuitry may include a first current mirror circuit with a first input coupled to receive the first output voltage from the first circuitry and a second input coupled to receive the second output voltage from the first circuitry, wherein the first current mirror circuit is configured to convert a difference between the first and second output voltages into the first voltage signal that is proportional to the operating temperature. The third circuitry may include a second current mirror circuit with a third input coupled to receive the second output voltage from the first circuitry, wherein the second current mirror circuit is configured to convert the second output voltage into the second voltage signal that is inversely proportional to the operating temperature. The first circuitry may include a first set of one or more diodes having a first emitter injection area, the first set of the one or more diodes configured to output the first output voltage; and a second set of one or more diodes having a second emitter injection area, the second set of the one or more diodes configured to output the second output voltage, wherein the second emitter injection area is greater than the first emitter injection area. The fourth circuitry may include circuitry configured to produce a first digital version of the first voltage signal; circuitry configured to produce a second digital version of the second voltage signal; and circuitry configured to produce a digital version of the difference voltage value from a difference between the first digital version of the first voltage signal and the second digital version of the second voltage signal, wherein the temperature of the location in the electronic circuitry is determined as a function of the digital version of the difference voltage value. The circuitry configured to produce the first digital version of the first voltage signal may include a first analog-to-digital converter, wherein the circuitry configured to produce the second digital version of the second voltage signal may include a second analog-to-digital converter, and wherein the circuitry configured to produce the difference voltage value may include subtraction circuitry configured to receive the first and second digital versions. The first and second analog-to-digital converters may be energized by a common reference voltage. The fourth circuitry may further include a first multiplexer with a first input configured to receive the first voltage signal that is proportional to the operating temperature, and a second input configured to receive the second voltage signal that is inversely proportional to the operating temperature, wherein an input of the first analog-to-digital converter is coupled to an output of the first multiplexer. The fourth circuitry may further include a second multiplexer with a first input configured to receive the second voltage signal that is inversely proportional to the operating temperature, and a second input configured to receive the first voltage signal that is proportional to the operating temperature, wherein an input of the second analog-to-digital converter is coupled to an output of the second multiplexer. The fourth circuitry may further include selection circuitry configured to sequentially select the first and second inputs to the first and second multiplexers in order to respectively produce first and second iterations of the difference voltage value. The fifth circuitry may be configured to determine the temperature of the location in the electronic circuitry as a function of an average of the first and second iterations of the difference voltage value. The fourth circuitry may further include a third multiplexer with a first input coupled to an output of the first analog-to-digital converter, a second input coupled to an output of the second analog-to-digital converter, and an output coupled to a first input of the subtraction circuitry; and a fourth multiplexer with a first input coupled to an output of the second analog-to-digital converter, a second input coupled to an output of the first analog-to-digital converter, and an output coupled to a second input of the subtraction circuitry, wherein the selection circuitry is configured to sequentially select the first and second inputs to the first, second, third, and fourth multiplexers in order to produce the at least first and second iterations of the difference voltage value.

Aspects of the present invention disclose a method for determining a temperature of a location in electronic circuitry, in which the method converts a first voltage signal that is proportional to the temperature of the location in the electronic circuitry to a first digital value, converts a second voltage signal that is inversely proportional to the temperature of the location in the electronic circuitry to a second digital value, determines a first difference value between the first and second digital values, and outputs the temperature of the location in the electronic circuitry as a function of the first difference value between the first and second digital values. In aspects of the method, the first voltage signal that is proportional to the temperature of the location in the electronic circuitry is a difference between the first and second voltages. The converting of the first and second voltage signals may be performed with first and second analog-to-digital converters energized with a common reference voltage. Aspects of the method may further convert the first voltage signal that is proportional to the temperature of the location in the electronic circuitry to a third digital value, convert the second voltage signal that is inversely proportional to the temperature of the location in the electronic circuitry to a fourth digital value, determine a second difference value between the third and fourth digital values, and output the temperature of the location in the electronic circuitry as a function of an average of the first and second difference values.

Aspects of the present invention disclose a system for determining a temperature of a location in electronic circuitry, in which the system includes a first set of circuit elements configured to output a first output voltage; a second set of circuit elements configured to output a second output voltage, wherein the first and second sets of circuit elements are resident in proximity to the location in the electronic circuitry, wherein the first and second output voltages independently vary as a function of an operating temperature of the electronic circuitry at the location, wherein the first and second output voltages are not equal; a first current mirror circuit with a first input coupled to receive the first output voltage and a second input coupled to receive the second output voltage, wherein the first current mirror circuit is configured to convert a difference between the first and second output voltages into a first voltage signal that is proportional to the operating temperature; a second current mirror circuit with a third input coupled to receive the second output voltage, wherein the second current mirror circuit is configured to convert the second output voltage into a second voltage signal that is inversely proportional to the operating temperature; and circuitry configured to determine the temperature of the location in the electronic circuitry as a function of a difference between the first and second voltage signals. The circuitry configured to determine the temperature of the location in the electronic circuitry as the function of the difference between the first and second voltage signals may include a first analog-to-digital converter configured to produce a first digital version of the first voltage signal, a second analog-to-digital converter configured to produce a second digital version of the second voltage signal, and subtraction circuitry configured to produce the difference between the first and second voltage signals as a function of a difference voltage value produced from a subtraction of the second digital version from the first digital version. The first and second analog-to-digital converters may be energized by one or more reference voltage sources that output a reference voltage that fluctuates its magnitude as a function of temperature. The first and second analog-to-digital converters may be energized by a common reference voltage. The system circuitry configured to determine the temperature of the location in the electronic circuitry as the function of the difference between the first and second voltage signals may further include a first multiplexer with a first input configured to receive the first voltage signal that is proportional to the operating temperature, and a second input configured to receive the second voltage signal that is inversely proportional to the operating temperature, wherein an input of the first analog-to-digital converter is coupled to an output of the first multiplexer; a second multiplexer with a first input configured to receive the second voltage signal that is inversely proportional to the operating temperature, and a second input configured to receive the first voltage signal that is proportional to the operating temperature, wherein an input of the second analog-to-digital converter is coupled to an output of the second multiplexer; and selection circuitry configured to sequentially select the first and second inputs to the first and second multiplexers in order to respectively produce first and second iterations of the difference voltage value. The circuitry configured to determine the temperature of the location in the electronic circuitry may be further configured to determine the temperature as a function of an average of the first and second iterations of the difference voltage value.

While these exemplary embodiments and aspects are described in sufficient detail to enable those skilled in the art to practice the invention, it should be understood that other embodiments may be realized and that various changes to the invention may be made without departing from the spirit and scope of the present invention. Thus, the previous more detailed description is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Though embodiments of the present invention are described utilizing PFETs, n-channel FETs ("NFETs") could also be utilized by inverting the received selection signals. Naturally, other equivalent switching devices could also be utilized.

Within this description and the claims, the singular forms "a," "an," and "the" include plural referents unless the context clearly dictates otherwise. The use of the word "a" or "an" when used in conjunction with the term "comprising" in the claims and/or the specification may mean "one," but it is also consistent with the meaning of "one or more," "at least one," and "one or more than one." The use of the term "or" in this description and the claims is used to mean "and/or" unless explicitly indicated to refer to alternatives only or the alternatives are mutually exclusive, although the disclosure supports a definition that refers to only alternatives and "and/or." Throughout this application, the terms "about" or "approximately" are used to indicate that a value includes the inherent variation of error for the device, the method being employed to determine the value, or the variation that exists among the study subjects.

As will be appreciated by one skilled in the art, aspects of the present invention are described herein with reference to a flowchart illustration and block diagrams of methods, apparatus (systems), and computer program products according to embodiments of the invention (e.g., the flow diagram illustrated in FIG. 7 implemented with the control logic block 418). Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuitry," "module," or "system." Furthermore, aspects of the present invention may take the form of a computer program product embodied in one or more computer readable medium(s) having computer readable program code embodied thereon. It will be further understood that each block of the flowchart illustration and block diagrams, and combinations of blocks in the flowchart illustration and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create circuitry configured to implement the functions/acts specified in the flowchart and block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device. Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages.

What is claimed is:

1. A system for determining a temperature of a location in electronic circuitry, comprising:
   first circuitry, in proximity to the location in the electronic circuitry, configured to adjust first and second output voltages as a function of an operating temperature of the electronic circuitry at the location;
   second circuitry configured to convert the first and second output voltages to a first voltage signal that is proportional to the operating temperature;
   third circuitry configured to convert the second output voltage to a second voltage signal that is inversely proportional to the operating temperature;
   fourth circuitry configured to determine a difference between the first voltage signal and the second voltage signal to produce a difference voltage value, including:
      circuitry configured to produce a first digital version of the first voltage signal, the circuitry configured to produce the first digital version includes a first analog-to-digital converter;
      circuitry configured to produce a second digital version of the second voltage signal, the circuitry configured to produce the second digital version includes a second analog-to-digital converter;
      circuitry configured to produce a digital version of the difference voltage value from a difference between the first digital version of the first voltage signal and the second digital version of the second voltage signal, the circuitry configured to produce the difference voltage value includes subtraction circuitry configured to receive the first and second digital versions; and fifth circuitry configured to determine the temperature of the location in the electronic circuitry as a function of the difference voltage value.

2. The system as recited in claim 1, wherein the second circuitry comprises a first current mirror circuit with a first input coupled to receive the first output voltage from the first circuitry and a second input coupled to receive the second output voltage from the first circuitry, wherein the first current mirror circuit is configured to convert a difference between the first and second output voltages into the first voltage signal that is proportional to the operating temperature.

3. The system as recited in claim 2, wherein the third circuitry comprises a second current mirror circuit with a third input coupled to receive the second output voltage from the first circuitry, wherein the second current mirror circuit is configured to convert the second output voltage into the second voltage signal that is inversely proportional to the operating temperature.

4. The system as recited in claim 1, wherein the first circuitry comprises:
a first set of one or more diodes having a first emitter injection area, the first set of the one or more diodes configured to output the first output voltage; and
a second set of one or more diodes having a second emitter injection area, the second set of the one or more diodes configured to output the second output voltage, wherein the second emitter injection area is greater than the first emitter injection area.

5. The system as recited in claim 1, wherein the temperature of the location in the electronic circuitry is determined as a function of the digital version of the difference voltage value.

6. The system as recited in claim 1, wherein the first and second analog-to-digital converters are energized by a common reference voltage.

7. The system as recited in claim 1, wherein the fourth circuitry further comprises:
a first multiplexer with a first input configured to receive the first voltage signal that is proportional to the operating temperature, and a second input configured to receive the second voltage signal that is inversely proportional to the operating temperature, wherein an input of the first analog-to-digital converter is coupled to an output of the first multiplexer;
a second multiplexer with a first input configured to receive the second voltage signal that is inversely proportional to the operating temperature, and a second input configured to receive the first voltage signal that is proportional to the operating temperature, wherein an input of the second analog-to-digital converter is coupled to an output of the second multiplexer; and
selection circuitry configured to sequentially select the first and second inputs to the first and second multiplexers in order to respectively produce first and second iterations of the difference voltage value.

8. The system as recited in claim 7, wherein the fifth circuitry is configured to determine the temperature of the location in the electronic circuitry as a function of an average of the first and second iterations of the difference voltage value.

9. The system as recited in claim 7, wherein the fourth circuitry further comprises:

a third multiplexer with a first input coupled to an output of the first analog-to-digital converter, a second input coupled to an output of the second analog-to-digital converter, and an output coupled to a first input of the subtraction circuitry; and
a fourth multiplexer with a first input coupled to an output of the second analog-to-digital converter, a second input coupled to an output of the first analog-to-digital converter, and an output coupled to a second input of the subtraction circuitry,
wherein the selection circuitry is configured to sequentially select the first and second inputs to the first, second, third, and fourth multiplexers in order to produce the at least first and second iterations of the difference voltage value.

10. A method for determining a temperature of a location in electronic circuitry, comprising:
converting a first voltage signal that is proportional to the temperature of the location in the electronic circuitry to a first digital value;
converting a second voltage signal that is inversely proportional to the temperature of the location in the electronic circuitry to a second digital value;
determining a first difference value between the first and second digital values; and
outputting the temperature of the location in the electronic circuitry as a function of the first difference value between the first and second digital values, wherein the converting of the first and second voltage signals is performed with first and second analog-to-digital converters energized with a common reference voltage.

11. The method as recited in claim 10, wherein the first voltage signal that is proportional to the temperature of the location in the electronic circuitry is a difference between first and second voltages.

12. The method as recited in claim 10, further comprising:
converting the first voltage signal that is proportional to the temperature of the location in the electronic circuitry to a third digital value;
converting the second voltage signal that is inversely proportional to the temperature of the location in the electronic circuitry to a fourth digital value;
determining a second difference value between the third and fourth digital values; and
outputting the temperature of the location in the electronic circuitry as a function of an average of the first and second difference values.

13. A system for determining a temperature of a location in electronic circuitry, comprising:
a first set of circuit elements configured to output a first output voltage;
a second set of circuit elements configured to output a second output voltage, wherein the first and second sets of circuit elements are resident in proximity to the location in the electronic circuitry, wherein the first and second output voltages independently vary as a function of an operating temperature of the electronic circuitry at the location, wherein the first and second output voltages are not equal;
a first current mirror circuit with a first input coupled to receive the first output voltage and a second input coupled to receive the second output voltage, wherein the first current mirror circuit is configured to convert a difference between the first and second output voltages into a first voltage signal that is proportional to the operating temperature;

a second current mirror circuit with a third input coupled to receive the second output voltage, wherein the second current mirror circuit is configured to convert the second output voltage into a second voltage signal that is inversely proportional to the operating temperature; and circuitry configured to determine the temperature of the location in the electronic circuitry as a function of a difference between the first and second voltage signals, including:

a first analog-to-digital converter configured to produce a first digital version of the first voltage signal;

a second analog-to-digital converter configured to produce a second digital version of the second voltage signal; and subtraction circuitry configured to produce the difference between the first and second voltage signals as a function of a difference voltage value produced from a subtraction of the second digital version from the first digital version.

14. The system as recited in claim 13, wherein the first and second analog-to-digital converters are energized by one or more reference voltage sources that output a reference voltage that fluctuates its magnitude as a function of temperature.

15. The system as recited in claim 13, wherein the first and second analog-to-digital converters are energized by a common reference voltage.

16. The system as recited in claim 15, wherein the circuitry configured to determine the temperature of the location in the electronic circuitry as the function of the difference between the first and second voltage signals further comprises:

a first multiplexer with a first input configured to receive the first voltage signal that is proportional to the operating temperature, and a second input configured to receive the second voltage signal that is inversely proportional to the operating temperature, wherein an input of the first analog-to-digital converter is coupled to an output of the first multiplexer;

a second multiplexer with a first input configured to receive the second voltage signal that is inversely proportional to the operating temperature, and a second input configured to receive the first voltage signal that is proportional to the operating temperature, wherein an input of the second analog-to-digital converter is coupled to an output of the second multiplexer; and selection circuitry configured to sequentially select the first and second inputs to the first and second multiplexers in order to respectively produce first and second iterations of the difference voltage value.

17. The system as recited in claim 16, wherein the circuitry configured to determine the temperature of the location in the electronic circuitry is further configured to determine the temperature as a function of an average of the first and second iterations of the difference voltage value.

* * * * *